US009189797B2

(12) United States Patent
Ghosh et al.

(10) Patent No.: US 9,189,797 B2
(45) Date of Patent: Nov. 17, 2015

(54) SYSTEMS AND METHODS FOR SENTIMENT DETECTION, MEASUREMENT, AND NORMALIZATION OVER SOCIAL NETWORKS

(71) Applicant: Topsy Labs, Inc., San Francisco, CA (US)

(72) Inventors: Rishab Aiyer Ghosh, San Francisco, CA (US); Scott Park Manley, Oakland, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 13/660,533

(22) Filed: Oct. 25, 2012

(65) Prior Publication Data

US 2013/0110928 A1    May 2, 2013

Related U.S. Application Data

(60) Provisional application No. 61/551,833, filed on Oct. 26, 2011.

(51) Int. Cl.
  *G06F 15/16* (2006.01)
  *G06Q 30/02* (2012.01)
  *G06Q 50/00* (2012.01)

(52) U.S. Cl.
  CPC .............. *G06Q 30/02* (2013.01); *G06Q 50/01* (2013.01)

(58) Field of Classification Search
  USPC ........................................................ 709/204
  See application file for complete search history.

(56) References Cited

U.S. PATENT DOCUMENTS

| 6,151,585 | A  | 11/2000 | Altschuler et al. |
| 6,286,005 | B1 | 9/2001  | Cannon |
| 7,512,612 | B1 | 3/2009  | Akella et al. |
| 7,636,714 | B1 | 12/2009 | Lamping et al. |
| 7,885,844 | B1 | 2/2011  | Cohen et al. |
| 8,086,605 | B2 | 12/2011 | Xu et al. |
| 8,166,026 | B1 | 4/2012  | Sadler |
| 8,166,925 | B2 | 5/2012  | Suggett |

(Continued)

FOREIGN PATENT DOCUMENTS

| JP | 2003288437 A    | 10/2003 |
| WO | WO-2006073977 A1 | 7/2006 |

(Continued)

OTHER PUBLICATIONS

International Search Report and the Written Opinion of the International Searching Authority for corresponding International Application No. PCT/US2012/062156, mailing date Apr. 8, 2013, 8 pages.

(Continued)

*Primary Examiner* — Tu Nguyen
(74) *Attorney, Agent, or Firm* — Blakely, Sokoloff, Taylor & Zafman LLP

(57) ABSTRACT

A new approach is proposed that contemplates systems and methods to provide the ability to detect, measure, aggregate, and normalize sentiments expressed by a group of users on a certain event or topic on a social network so that the normalized sentiments truly reflect the sentiments of the general public on that specific event or topic. Additionally, the collected and measured sentiments of an individual user expressed on a social network can also be normalized against a baseline sentiment that reflects in order to truly reflect the individual user's sentiment at the time of his/her expression.

33 Claims, 2 Drawing Sheets

(56) References Cited

U.S. PATENT DOCUMENTS

| | | |
|---|---|---|
| 8,352,549 B2 | 1/2013 | Sacco et al. |
| 8,572,173 B2 | 10/2013 | Briere et al. |
| 2003/0110056 A1 | 6/2003 | Berghofer et al. |
| 2003/0229531 A1 | 12/2003 | Heckerman et al. |
| 2004/0225592 A1 | 11/2004 | Churquina |
| 2005/0060312 A1 | 3/2005 | Curtiss et al. |
| 2005/0131897 A1 | 6/2005 | Grasso et al. |
| 2005/0154690 A1 | 7/2005 | Nitta et al. |
| 2005/0192957 A1 | 9/2005 | Newbold |
| 2005/0256866 A1 | 11/2005 | Lu et al. |
| 2006/0041543 A1 | 2/2006 | Achlioptas |
| 2006/0059055 A1 | 3/2006 | Lin |
| 2006/0074836 A1 | 4/2006 | Gardner et al. |
| 2006/0112111 A1 | 5/2006 | Tseng et al. |
| 2006/0112146 A1 | 5/2006 | Song et al. |
| 2006/0218577 A1 | 9/2006 | Goodman et al. |
| 2006/0248073 A1 | 11/2006 | Jones et al. |
| 2006/0294085 A1 | 12/2006 | Rose et al. |
| 2006/0294086 A1 | 12/2006 | Rose et al. |
| 2006/0294134 A1 | 12/2006 | Berkhim et al. |
| 2007/0027744 A1 | 2/2007 | Carson et al. |
| 2007/0078699 A1 | 4/2007 | Scott et al. |
| 2007/0121843 A1 | 5/2007 | Atazky et al. |
| 2007/0124432 A1 | 5/2007 | Holtzman et al. |
| 2007/0150398 A1 | 6/2007 | Rossen et al. |
| 2007/0156636 A1 | 7/2007 | Norton et al. |
| 2007/0168533 A1 | 7/2007 | Canright et al. |
| 2007/0208613 A1 | 9/2007 | Backer |
| 2007/0219863 A1 | 9/2007 | Park et al. |
| 2007/0226248 A1 | 9/2007 | Darr |
| 2007/0282867 A1 | 12/2007 | Mcallister et al. |
| 2007/0297405 A1 | 12/2007 | He |
| 2008/0004942 A1 | 1/2008 | Calabria |
| 2008/0010253 A1 | 1/2008 | Sidhu et al. |
| 2008/0059466 A1 | 3/2008 | Luo et al. |
| 2008/0104225 A1 | 5/2008 | Zhang et al. |
| 2008/0133426 A1 | 6/2008 | Porat et al. |
| 2008/0215429 A1 | 9/2008 | Ramer et al. |
| 2008/0215557 A1 | 9/2008 | Ramer et al. |
| 2008/0215571 A1 | 9/2008 | Huang et al. |
| 2008/0275833 A1 | 11/2008 | Zhou et al. |
| 2008/0288305 A1 | 11/2008 | LaLuzerne et al. |
| 2008/0288596 A1 | 11/2008 | Smith et al. |
| 2008/0313011 A1 | 12/2008 | Rose et al. |
| 2009/0049038 A1 | 2/2009 | Gross |
| 2009/0106224 A1 | 4/2009 | Roulland et al. |
| 2009/0106244 A1 | 4/2009 | Dash et al. |
| 2009/0119173 A1 | 5/2009 | Parsons et al. |
| 2009/0217178 A1* | 8/2009 | Niyogi et al. ............ 715/753 |
| 2009/0234828 A1 | 9/2009 | Tu |
| 2009/0240647 A1 | 9/2009 | Green et al. |
| 2009/0276500 A1 | 11/2009 | Karmarkar |
| 2009/0319342 A1 | 12/2009 | Shilman et al. |
| 2010/0058196 A1 | 3/2010 | Krishnan et al. |
| 2010/0070448 A1 | 3/2010 | Omoigui |
| 2010/0100537 A1 | 4/2010 | Druzgalski et al. |
| 2010/0119053 A1 | 5/2010 | Goeldi |
| 2010/0121817 A1 | 5/2010 | Meyer |
| 2010/0121839 A1 | 5/2010 | Meyer |
| 2010/0174692 A1 | 7/2010 | Meyer |
| 2010/0306192 A1 | 12/2010 | Kapur et al. |
| 2011/0004465 A1 | 1/2011 | Rose et al. |
| 2011/0022602 A1 | 1/2011 | Luo et al. |
| 2011/0078156 A1 | 3/2011 | Koss |
| 2011/0093459 A1 | 4/2011 | Dong et al. |
| 2011/0191372 A1 | 8/2011 | Kaushansky et al. |
| 2011/0212717 A1 | 9/2011 | Rhoads et al. |
| 2012/0166438 A1 | 6/2012 | Wu et al. |
| 2012/0215903 A1* | 8/2012 | Fleischman et al. .......... 709/224 |

FOREIGN PATENT DOCUMENTS

| | | |
|---|---|---|
| WO | WO2006/116516 A2 | 11/2006 |
| WO | WO2008/006059 A2 | 1/2008 |

OTHER PUBLICATIONS

International Preliminary Report on Patentability for corresponding International Application No. PCT/US2012/062156, mailing date May 8, 2014, 7 pages.

Fan, et al., "Suggesting Topic-Based Query Terms as Your Type", 2010 12th International Asia-Pacific Web Conference (Apr. 2010).

Guha, R., Kumar, R., Raghavan, P., and Tomkins, A. 2004. Propagation of trust and distrust. In Proceedings of the 13th International Conference on World Wide Web (New York, NY, USA, May 17-20, 2004). WWW '04. ACM, New York, NY, pp. 403-412.

Ziegler, C. and Lausen, G. 2005. Propagation Models for Trust and Distrust in Social Networks. Information Systems Frontiers 7, 4-5 (Dec. 2005), 337-358.

Tao, Yufei et al: "Selectivity Estimation of Predictive Spatio-Temporal Queries", Proceedings 19th International Conference on Data Engineering (ICDE'2003). Bangladore, India, Mar. 5-8, 2003; pp. 417-428.

Dai, Na et al: "Mining Anchor Text Trends for Retrieval" Mar. 28, 2010; pp. 127-139.

Ashkan, Azin et al: "Classifying and Characterizing Query Intent", Apr. 6, 2009, pp. 578-586.

Garfield, E.:"Citation Analysis as a Tool in Journal Evaluation", 1972, pp. 527-544, XP002381248.

Johnson, Caleb: "Likebutton.me Reveals What Your Friends 'Like' Across the Web"; Apr. 26, 2010, pp. 1-7; XP000002656471.

Anonymous: "H-index", Wikipedia, Internet Article, Jun. 10, 2010; pp. 1-3; XP000002656472.

Dietz, Laura et al: "Unsupervised Prediction of Citation Influences", Proceedings of the 24th International Conference on Machine Learning, Jun. 20, 2007; pp. 233-240; XP55004362.

Huang, Jeff et al: "Conversational Tagging in Twitter", Proceedings of the 21st ACM Conference on Hypertext and Hypermedia; Jun. 13, 2010; p. 173; XP55004356.

Page, L. et al: "The PageRank Citation Ranking: Bringing Order to the Web", Internet Citation; Jan. 29, 1998; XP002213518.

Massa, Paolo et al: "Using Trust in Recommender Systems: An Experimental Analysis" Feb. 26, 2004; pp. 221-235, section 1.1; pp. 222-223, sections 1.3 and 2; pp. 225-227.

Liu, "Co-authorship networks in the digital brary research community", 2005, Elsevier, Information Processing and Management 41 (2005) pp. 1462-1480.

Von Der Weth, "Towards an objective assessment of centrality measures in reputation systems", 2007, IEEE, 0-7695-2913.

Zhou, "Powertrust: A robust and scalable reputation system for trusted peer-to-peer computing", 2007, IEEE, 1-45-921907.

Lu at al., "Finding Query Suggestions for PubMed", 2009, AMIA.

Makkonen et al., Topic Detection and Tracking with Spatio-Temporal Evidence, published Spring 2003.

Wolf, J.L. et al., "Optimal Crawling Strategies for Web Search Engines", Proceedings of the 11th International Conference on World Wide Web, 2002, p. 136-147.

* cited by examiner

SYSTEMS AND METHODS FOR SENTIMENT DETECTION, MEASUREMENT, AND NORMALIZATION OVER SOCIAL NETWORKS

RELATED APPLICATIONS

This application claims priority to U.S. Provisional Patent Application No. 61/551,833, filed Oct. 26, 2011, and entitled "Mood normalization in sentiment detection," and is hereby incorporated herein by reference.

BACKGROUND

Social media networks such as Facebook, Twitter, and Google Plus have experienced exponential growth in recently years as web-based communication platforms. Hundreds of millions of people are using various forms of social media networks every day to communicate and stay connected with each other. Consequently, the resulting activities from the users on the social media networks, such as tweets posted on Twitter, becomes phenomenal and can be collected for various kinds of measurements and analysis. Specifically, these user activity data can be retrieved from the social data sources of the social networks through their respective publicly available Application Programming Interfaces (APIs), indexed, processed, and stored locally for further analysis.

These stream data from the social networks collected in real time along with those collected and stored overtime provide the basis for a variety of measurements and analysis. Some of the metrics for measurements and analysis include but are not limited to:
Number of mentions—Total number of mentions for a keyword, term or link;
Number of mentions by influencers—Total number of mentions for a keyword, term or link by an influential user;
Number of mentions by significant posts—Total number of mentions for a keyword, term or link by tweets that have been retweeted or contain a link;
Velocity—The extent to which a keyword, term or link is "taking off" in the preceding time windows (e.g., seven days).

In addition to the above measurements and analysis performed on the content of the data, it is also important to analyze the aggregated sentiments of the users expressed through their activities (e.g., Tweets and posts) on the social networks as well. For a non-limiting example, such aggregated sentiments can be measured by the percentage of tweets expressed by a group of users on the certain topic over a certain period of time that are positive, neutral and negative. Although such measurement of the sentiments of the users expressed over the social networks provide real-time gauges of their views/opinions, such measurement may be biased due to various factors, including but not limited to, the type of users most active and thus most likely to express their feelings on the social networks, timing and preferred way of expression by each individual user, etc. Consequently, as measured, the sentiments of users expressed on the social networks on certain matters or events may not be a true and accurate reflection of the sentiments of the public at large.

The foregoing examples of the related art and limitations related therewith are intended to be illustrative and not exclusive. Other limitations of the related art will become apparent upon a reading of the specification and a study of the drawings.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to provide the ability to detect, measure, aggregate, and normalize sentiments expressed by a group of users on a certain event or topic on a social network so that the normalized sentiments truly reflect the sentiments of the general public on that specific event or topic. Here, the measurement of the aggregated sentiments expressed by the users can be normalized based on one or more of the natural bias of the social network on which the opinions of the users are expressed, nature of the event or topic of the discussion, and the timing of the activities of the users on the social network. Additionally, the collected and measured sentiments of an individual user expressed on a social network can also be normalized against a baseline sentiment that reflects the natural tendency of each individual user and/or sentiments expressed in other content linked to the individual user in order to truly reflect the user's sentiment at the time of his/her expression.

As referred to hereinafter, a social media network or social network, can be any publicly accessible web-based platform or community that enables its users/members to post, share, communicate, and interact with each other. For non-limiting examples, such social media network can be but is not limited to, Facebook, Google+, Tweeter, LinkedIn, blogs, forums, or any other web-based communities.

As referred to hereinafter, a user's activities on a social media network include but are not limited to, tweets, replies and/or re-tweets to the tweets, posts, comments to other users' posts, opinions (e.g., Likes), feeds, connections (e.g., add other user as friend), references, links to other websites or applications, or any other activities on the social network. In contrast to a typical web content, which creation time may not always be clearly associated with the content, one unique characteristics of a user's activities on the social network is that there is an explicit time stamp associated with each of the activities, making it possible to establish a pattern of the user's activities over time on the social network.

Figure 1:
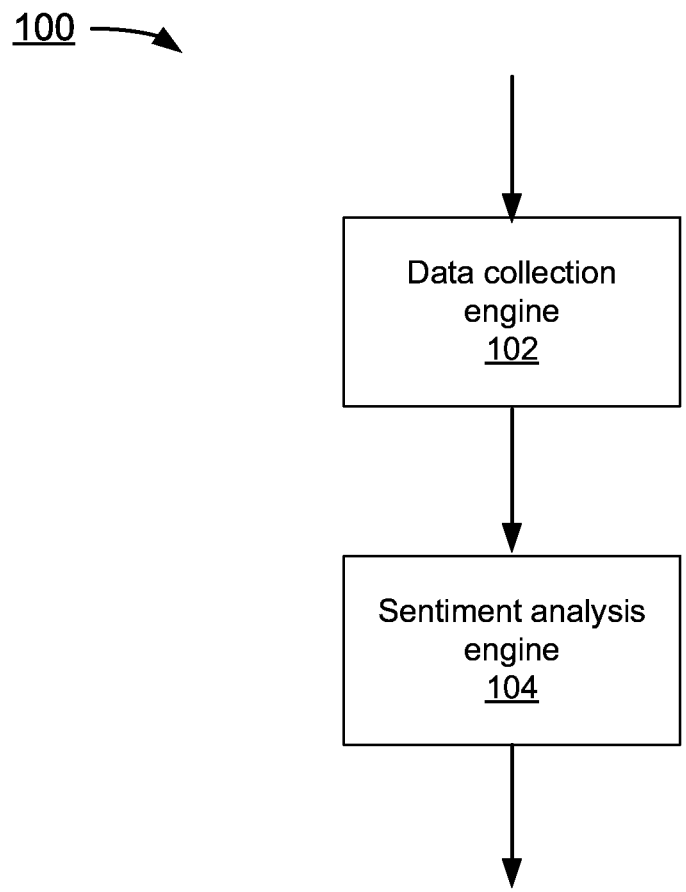
FIG. 1 depicts an example of a system diagram to support sentiment detection, measurement, and normalization over social networks.

FIG. 1 depicts an example of a system diagram to support sentiment detection, measurement, and normalization over social networks. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least data collection engine 102 and sentiment analysis engine 104.

As used herein, the term engine refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 1, each of the engines can run on one or more hosting devices (hosts). Here, a host can be a computing device, a communication device, a storage device, or any electronic device capable of running a software component. For non-limiting examples, a computing device can be but is not limited to a laptop PC, a desktop PC, a tablet PC, an iPod, an iPhone, an iPad, Google's Android device, a PDA, or a server machine. A storage device can be but is not limited to a hard disk drive, a flash memory drive, or any portable storage device. A communication device can be but is not limited to a mobile phone.

In the example of FIG. 1, data collection engine 102 and sentiment analysis engine 104 each has a communication interface (not shown), which is a software component that enables the engines to communicate with each other following certain communication protocols, such as TCP/IP protocol, over one or more communication networks (not shown). Here, the communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

In the example of FIG. 1, data collection engine 102 collects data on activities of the users on a social network by periodically crawling the social network to collect the latest activity data from each of the users. Given the vast amount of the data accessible in a social media network, data collection engine 102 may collect data from each individual user selectively based on an activity collection schedule for the user. If a user's activities are not to be collected at the time of the crawling according to the user's activity collection schedule, data collection engine 102 will skip the content related to the user and move on to the next user whose activity is to be collected according to his/her schedule. Such selective collection of data by data collection engine 102 reduces the time and resources required for each around of crawling without comprising on the freshness of the data collected. In some embodiments, data collection engine 102 may run and coordinate multiple crawlers coming from different Internet addresses (IPs) in order to collect as much data as possible. Social media crawling engine 106 may also maximize the amount of new data collected per (HTTP) request.

In some embodiments, data collection engine 102 may establish an activity distribution pattern/model for each of the users over time based on the timestamps associated with the activities of the user on the social network. Such activity distribution pattern over time may reflect when each individual user is most or least active on the social network and the frequency of the user's activities on the social network and can be used to set up the activity collection schedule for the user. For a non-limiting example, the user may be most active on the social network between the hours of 8-12 in the evenings while may be least active during early mornings, or the user is most active on weekends rather than week days.

In some embodiments, data collection engine 102 may also determine whether and/or when each individual user is likely to be most active upon the occurrence of certain events, such as certain sports event or product news (e.g., iPhone release) the user is following. Alternatively, data collection engine 102 may determine that the user's activities are closely related to the activities of one or more his/her friends the user is connected to on the social network. For a non-limiting example, if one or more of the user's friends become active, e.g., starting an interesting discussion or participating in an online game, it is also likely to cause to user to get actively involved as well.

In some embodiments, data collection engine 102 may collect data on the activities of the users on the social network by utilizing an application programming interface (API) provided by the social network. For a non-limiting example, the OpenGraph API provided by Facebook exposes multiple resources (i.e., data related to activities of a user) on the social network, wherein every type of resource has an ID and an introspection method is available to learn the type and the methods available on it. Here, IDs can be user names and/or numbers. Since all resources have numbered IDs and only some have named IDs, only use numbered IDs are used to refer to resources.

In the example of FIG. 1, sentiment analysis engine 104 detects and identifies the sentiments expressed by the users in the collected data of their activities on the social network with respect to/toward a specific event or topic via a number of sentiment text scoring schemes, which take into consideration the ways and the nuances of how people express themselves within social media network in general, and specifically within Twitter. In the non-limiting example of Twitter, there are significant differences in how people express themselves within 140 character constraint of a tweet that traditional sentiment measurement technique do not handle well. Based on the analysis and testing of the mass amount of data that has been collected in real time and stored over time by data collection engine 102, sentiment analysis engine 104 is able to identify a number of "twitterisms" in the tweets, i.e., specific characteristics of sentiment expressions in the collected data that are not only indicative of how people feel about certain event or things, but are also unique to how people express themselves on a social network such as Twitter using tweets. These identified characteristics of sentiment expressions are utilized by the number of sentiment text scoring schemes for detecting the sentiments expressed by the users on the social network, Here, the sentiment of each user can be characterized as very positive, positive, flat, negative, very negative.

Once the sentiments of the users are detected based on the collected activities of the users, sentiment analysis engine 104 evaluates and aggregates the sentiments of the users (positive or negative sentiments) toward the specific event or topic. For a non-limiting example, analyzing iPhone related tweets on Twitter around the launch time of a new iPhone may show that 21% of the users are positive vs. 18% of the users are negative. If the time period is extended to one week or one month after the launch, the social sentiment score may point to a different sentiment score (higher percentage of users being positive or negative) as the users have more time experience with the new iPhone.

In some embodiments, sentiment analysis engine 104 normalizes the aggregated sentiments of the users and/or the sentiment of each individual user against a baseline sentiment that takes into account one or more factors/bias, which include but are not limited to, the natural bias of the social network on which the opinions of the users are expressed, nature of the event or topic of the discussion, and the timing of the activities of the users on the social network. Here, various statistical measures, such as means, averages, standard deviations, coherence or any combination of these measures can be used by sentiment analysis engine 104 to normalize the measured sentiments of the users over time. Such sentiment normalization is necessary in order to obtain an accurate measure of the sentiment of each individual user and/or the general public toward the specific event. In addition, sentiment analysis engine 104 may normalize the measured sentiment of each individual user against the natural tendency of each individual user and/or sentiments expressed in other content linked to the individual user.

In some embodiments, sentiment analysis engine 104 calculates a social sentiment score for the event or topic based on normalized measurement of sentiments of each individual user or the users as a group. Here, the social sentiment score for the event represents normalized sentiments of the individual user or users expressed on the social network toward the current event and/or over certain time period (depending upon the timestamps of the activities of the users being analyzed), wherein such social sentiment score reflect either the true sentiment of the individual user or the sentiments of the general public.

In the previous example of analyzing sentiments of users around the launching of new iPhone, the measured sentiment based on tweets of the users on Twitter is only slightly positive (21% positive vs. 18% negative) toward iPhone launch. However, since the sentiments expressed on Twitter tends to be more negative than the sentiments of the general public, the slight positive sentiment reading is in fact much more positive when normalized by sentiment analysis engine 104 against the negative bias of Twitter.

For another non-limiting example, the most intense negative sentiment expressed by users on Twitter tends to be toward things related to politics, while the most intense positive sentiment is not as intense as the negative sentiment, and focus on non-controversial topics such as travel, photography, etc. As such, sentiment scores measured by sentiment analysis engine 104 have to be normalized with this knowledge in mind and a slightly positive reading on a political event may actually indicate that the event is fairly well received when normalized with the fact that most sentiments around political terms are overwhelmingly negative.

For another non-limiting example, if User #1 tends to be more positive in his/her choice of words/phrases (e.g., he/she always says "that's great"), while User #2 tends to be more reserved in his/her choice of words/phrases (e.g., he/she always says "that's ok"), then a positive expression (e.g., "that's great") by User #2 is in fact quite positive when being normalized by sentiment analysis engine 104 against his/her negative bias, while the same expression by User #1 may be just neutral when being normalized against his/her positive bias.

Figure 2:
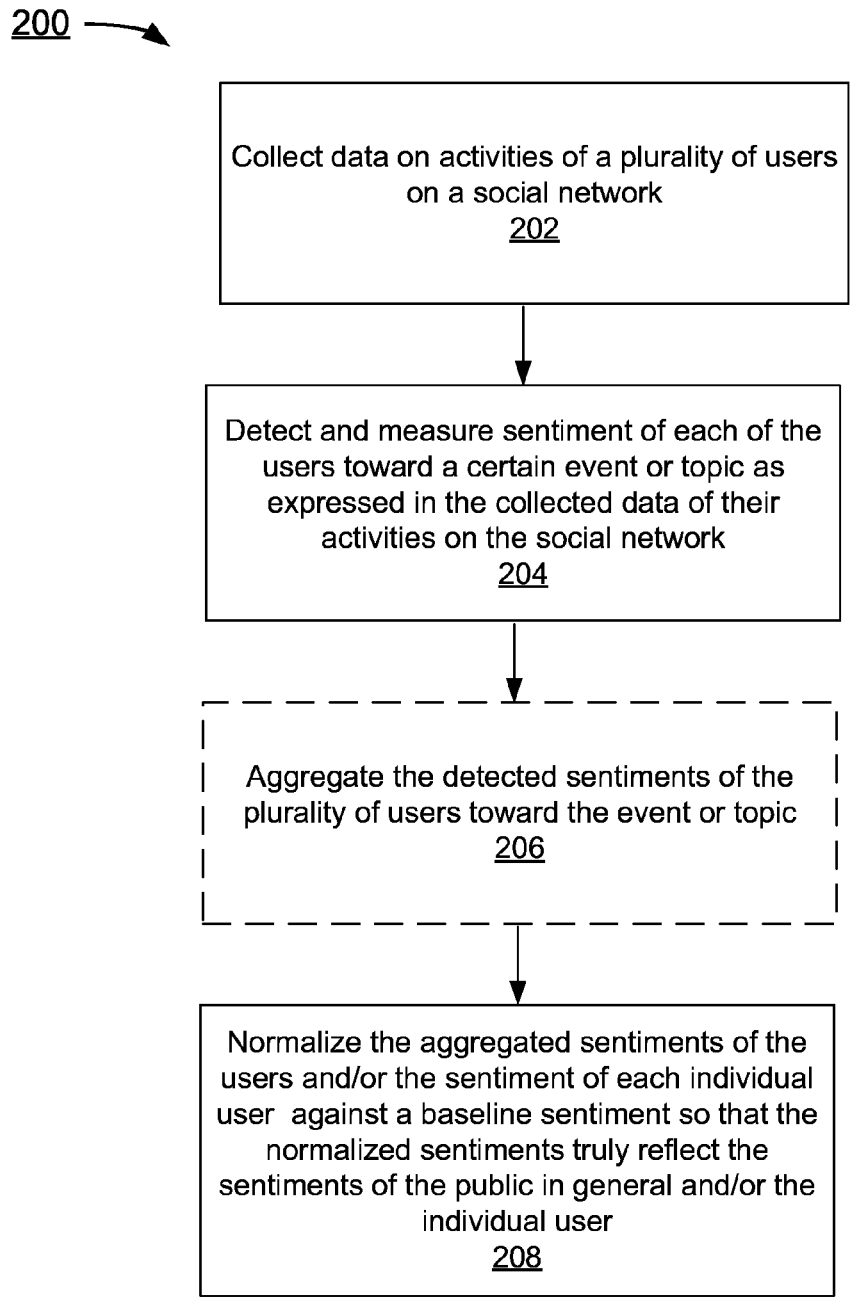
FIG. 2 depicts an example of a flowchart of a process to support sentiment detection, measurement, and normalization over social networks.

FIG. 2 depicts an example of a flowchart of a process to support sentiment detection, measurement, and normalization over social networks. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202 where data on activities of a plurality of users on a social network is collected. The flowchart 200 continues to block 204 where sentiment of each of the users toward a certain event or topic as expressed in the collected data of their activities on the social network are detected and measured. The flowchart 200 continues to block 206 where the detected sentiments of the plurality of users toward the event or topic are optionally aggregated. The flowchart 200 ends at block 208 where the aggregated sentiments of the users and/or the sentiment of each individual user is normalized against a baseline sentiment so that the normalized sentiments truly reflect the sentiments of the public in general and/or the individual user toward the event or topic.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The invention claimed is:

1. A system, comprising:
   a data collection engine, which in operation, collects data on activities of a plurality of users on a social network, wherein each of the activities includes content regarding those activities;
   a sentiment analysis engine with a processor, which in operation,
   detects and measures sentiment of each of the plurality of users toward an event as expressed in the collected data of their activities on the social network;
   aggregates the detected sentiments of the plurality of users toward the event;
   normalizes the aggregated sentiments of the users towards the event against a baseline sentiment for that event, so that the normalized sentiments reflect the sentiments of the general public toward the event, wherein the baseline sentiment and aggregated sentiments is based on the content of the activities.

2. The system of claim 1, wherein:
   the social network is a publicly accessible web-based platform or community that enables its users/members to post, share, communicate, and interact with each other.

3. The system of claim 1, wherein:
the social network is one of Facebook, Google+, Tweeter, LinkedIn, blogs, forums, or any other web-based communities.

4. The system of claim 1, wherein:
activities of the user on the social media network include one or more of tweets, replies and/or re-tweets to the tweets, posts, comments to other users' posts, opinions, feeds, connections, references, links to other websites or applications, or any other activities on the social network.

5. The system of claim 1, wherein:
the data collection engine collects the data on the activities of the users on the social network by periodically crawling the social network to collect the latest activity data from the users.

6. The system of claim 1, wherein:
the data collection engine collects the data on the activities of the users on the social network by utilizing an application programming interface (API) provided by the social network.

7. The system of claim 1, wherein:
the sentiment analysis engine detects and identifies the sentiments expressed by the users in the collected data of their activities on the social network via a number of sentiment text scoring schemes that take into consideration the ways people express themselves on the social media network.

8. The system of claim 7, wherein:
the number of sentiment text scoring schemes utilize specific characteristics of sentiment expressions identified in the collected data for detecting the sentiments expressed by the users on the social network.

9. The system of claim 1, wherein:
the sentiment analysis engine normalizes the aggregated sentiments of the users against the baseline sentiment for that event that takes into account the natural bias of the social network on which the opinions of the users are expressed.

10. The system of claim 1, wherein:
the sentiment analysis engine normalizes the aggregated sentiments of the users against the baseline sentiment for that event that takes into account nature of the event.

11. The system of claim 1, wherein:
the sentiment analysis engine normalizes the aggregated sentiments of the users against the baseline sentiment for that event that takes into account timing of the activities of the users on the social network.

12. The system of claim 1, wherein:
the sentiment analysis engine calculates a social sentiment score for the event based on normalized measurement of the sentiments of the users.

13. A system, comprising:
a data collection engine with a processor, which in operation, collects data on activities of a user on a social network, wherein each of the activities includes content regarding those activities;
a sentiment analysis engine with a processor, which in operation,
detects and measures sentiment of the user toward an event as expressed in the collected data of the activities of the user on the social network;
normalizes the measured sentiment of the user towards the event against a baseline sentiment for the event so that the normalized sentiment reflects the real sentiment of the user toward the event, wherein the baseline sentiment and measured sentiment is based on the content of the activities.

14. The system of claim 13, wherein:
the data collection engine selectively collects the data from the user based on an activity collection schedule for the user.

15. The system of claim 13, wherein:
the data collection engine establishes an activity distribution pattern for the user over time based on the timestamps associated with the activities of the user on the social network.

16. The system of claim 13, wherein:
the data collection engine determines whether or when the user will be most active upon the occurrence of certain events.

17. The system of claim 13, wherein:
the sentiment analysis engine normalizes the measured sentiment of the user against sentiments expressed in other content linked to the individual user.

18. The system of claim 13, wherein:
the sentiment analysis engine normalizes the measured sentiments of the user against the baseline sentiment for that event that takes into account natural tendency of the user.

19. A method, comprising:
collecting data on activities of a plurality of users on a social network, wherein each of the activities includes content regarding those activities;
detecting and measuring sentiment of each of the plurality of users toward an event as expressed in the collected data of their activities on the social network;
aggregating the detected sentiments of the plurality of users toward the event;
normalizing, with a sentiment detection system, the aggregated sentiments of the users towards the event against a baseline sentiment for that event so that the normalized sentiments reflect the sentiments of the general public toward the event, wherein the baseline sentiment and aggregated sentiments is based on the content of the activities.

20. The method of claim 19, further comprising:
collecting the data on the activities of the users on the social network by periodically crawling the social network to collect the latest activity data from the users.

21. The method of claim 19, further comprising:
collecting the data on the activities of the users on the social network by utilizing an application programming interface (API) provided by the social network.

22. The method of claim 19, further comprising:
detecting and identifying the sentiments expressed by the users in the collected data of their activities on the social network via a number of sentiment text scoring schemes that take into consideration the ways people express themselves on the social media network.

23. The method of claim 19, further comprising:
utilizing specific characteristics of sentiment expressions identified in the collected data for detecting the sentiments expressed by the users on the social network.

24. The method of claim 19, further comprising:
normalizing the aggregated sentiments of the users against the baseline sentiment for that event that takes into account the natural bias of the social network on which the opinions of the users are expressed.

25. The method of claim 19, further comprising:
normalizing the aggregated sentiments of the users against the baseline sentiment for that event that takes into account nature of the event.

26. The method of claim 19, further comprising:
normalizing the aggregated sentiments of the users against the baseline sentiment for that event that takes into account timing of the activities of the users on the social network.

27. The method of claim 19, further comprising:
calculating a social sentiment score for the event or topic based on normalized measurement of the sentiments of the users.

28. The method, comprising:
collecting data on activities of a user on a social network, wherein each of the activities includes content regarding those activities;
detecting and measuring sentiment of the user toward an event as expressed in the collected data of the activities of the user on the social network;
normalizing, with a sentiment detection system, the measured sentiment of the user towards the event against a baseline sentiment for that event so that the normalized sentiment reflects the real sentiment of the user toward the event, wherein the baseline sentiment and measured sentiment is based on the content of the activities.

29. The method of claim 28, further comprising:
selectively collecting the data from the user based on an activity collection schedule for the user.

30. The method of claim 28, further comprising:
establishing an activity distribution pattern for the user over time based on the timestamps associated with the activities of the user on the social network.

31. The method of claim 28, further comprising:
determining whether or when the user will be most active upon the occurrence of certain events.

32. The method of claim 28, further comprising:
normalizing the measured sentiment of the user against sentiments expressed in other content linked to the individual user.

33. The method of claim 28, further comprising:
normalizing the measured sentiments of the user against the baseline sentiment for that event that takes into account natural tendency of the user.

\* \* \* \* \*